Feb. 22, 1966   G. L. DONNELLAN   3,236,573
LOW FRICTION GREASELESS BEARINGS
Filed April 5, 1963

3,236,573
LOW FRICTION GREASELESS BEARINGS
Gerald Lowe Donnellan, Clevedon, Somerset, England, assignor, by mesne assignments, to American Metal Products Company
Filed Apr. 5, 1963, Ser. No. 270,979
13 Claims. (Cl. 308—238)

This invention relates to low friction greaseless bearings and is primarily concerned with improvements in the composition and construction thereof.

Accordingly, the invention provides a low friction greaseless bearing element having at least one bearing face moulded or formed from a mixture of hard wearing low friction thermoplastic synthetic resin and a polymerised fluorinated hydrocarbon.

Figure 1:
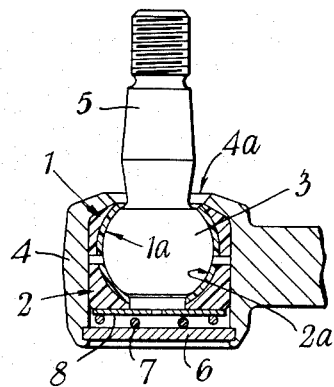
Figure 4:
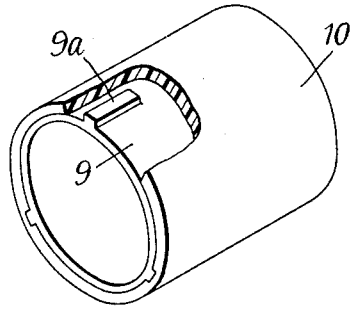
Figure 2:
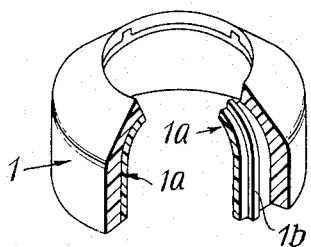
Figure 5:
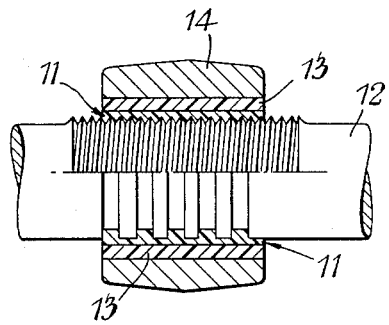
Figure 3:
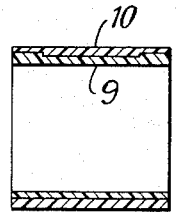
Figure 6:
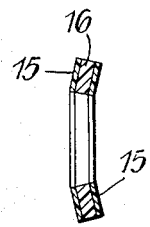
Figure 7:
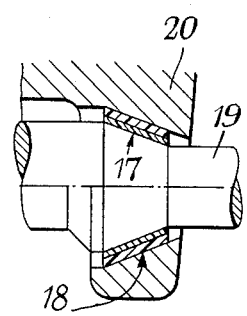

In order that the invention may be clearly understood and readily carried into effect, a number of embodiments thereof will now be described in detail with reference to the accompanying drawings in which:

FIGURE 1 is a sectional elevation showing a ball joint with a bearing constructed in accordance with the invention, FIGURE 2 is a perspective view, partially broken away and to a larger scale, showing part of the bearing of FIGURE 1, FIGURE 3 is a cross-sectional elevation showing a bearing element in the form of a journal bush, FIGURE 4 is a perspective view, to a larger scale and partially broken away, showing the bearing element of FIGURE 3, FIGURE 5 is a cross-sectional elevation showing two alternative forms of bearing element each providing a combined journal and thrust bearing, FIGURE 6 is a cross-sectional elevation showing a bearing element in the form of a thrust washer, and FIGURE 7 is a cross-sectional elevation, partially broken away, showing a bearing element of hollow frusto-conical form.

A low friction greaseless bearing element of the invention has at least one bearing face composed of a mixture of hard wearing low friction thermoplastic synthetic resin, constituted by one of the polyamides, such as nylon, the polyethylenes or the polyurethanes, and a polymerised fluorinated hydrocarbon such as polytetra-fluoroethylene. The polytetrafluoroethylene may be in any form such as discrete particles, chopped up extrusions, granules or fibres. This mixture, which is hereinafter referred to as the "defined mixture," is conveniently moulded or formed into a thin-walled structure having the required shape.

The non-bearing surface of the aforesaid structure may be provided, during the moulding or forming operation, with one or more excrescencies or projections of any desired shape and disposition, to provide a keyed location for backing or supporting material which can be applied to the aforesaid non-bearing surface. This backing or supporting material may again be one of the polyamides such as nylon, the polyethylenes or the polyurethanes, or may be an elastomeric type of material. The backing or supporting material may then be formed, injection moulded, bonded or keyed around a pre-formed bearing structure, or the bearing structure may be layered around a journal, ball or other surface and the backing material may then be injection moulded between the layer and a containing housing. Alternatively, the bearing structure and backing or supporting material may be formed as separate mouldings and subsequently fitted together. If thermosetting plastic material is used for the backing, the defined mixture of bearing material will then conveniently be moulded to the backing. By making the backing flexible, it may also be arranged to apply pre-load and/or to take up manufacturing inaccuracies.

It will be understood that the backing or supporting material referred to may be applied either to the inner or outer face of a bearing structure in ring form depending upon whether an internal or external bearing surface is required. Equally the backing or supporting material could be attached to a disc-like bearing structure or sandwiched between two such bearing structures.

A bearing liner or element constructed as generally described in the foregoing can, of course, be applied to a wide variety of bearing functions and the shaping and final form will depend upon the intended application. A few typical forms of bearings or elements have been illustrated in the accompanying drawings purely by way of non-limitative example.

Thus in FIGURES 1 and 2 of the drawings, a bearing of the invention is shown in the form of two half sockets 1 and 2 for a ball joint. The half sockets 1 and 2 are each provided with an inner bearing structure 1a, 2a composed of the defined mixture and moulded to form a thin-walled annular ring, and a flexible backing of nylon or other backing material which is moulded around the outer surface of the bearing structure and secured in position by keys such as 1b. As shown in FIGURE 1, the two socket rings are conveniently located around a ball 3 in a conventional housing 4 having a mouth 4a at one end through which a stud 5 on the ball projects. The other end of the housing is conveniently closed by a removable cover 6 with a spring 7 and bearing plate 8 located between the cover and adjoining socket half 2.

In the foregoing only one typical form of ball joint has been described, but it will be understood that bearing elements of the invention are equally applicable to any other type of ball joint which may be in two parts as shown or in one part. Equally the inner bearing structure and outer backing may be moulded as aforesaid or may be provided in any of the aforementioned ways. The backing on the socket parts can, of course, be flexible and arranged to apply pre-load to the joint, as also to take up any inaccuracies in the shaping of the ball or inner housing wall.

In FIGURES 3 and 4, a bearing element of the invention is shown in the form of a plain journal bearing bush. It will be understood, however, that the bush could equally be flanged at one or both ends if required. The bush as shown is composed of an inner thin-walled sleeve 9 which constitutes the bearing structure and is composed of the defined mixture. This sleeve 9 is backed or enclosed by an outer backing sleeve 10 which is located in position on the inner sleeve 9 by keys or projections 9a which project from the outer cylindrical periphery of the inner sleeve. Again the backing material may be moulded around the inner bearing structure or, depending upon the disposition of the keys, may be made as a separate sleeve moulding and subsequently fitted in position, or both the bearing structure and backing could be made in any other of the ways previously referred to.

FIGURE 5 shows two forms of bearing element of the invention each providing a combined journal and thrust bearing. For this purpose the bearing structure composed of the defined mixture is formed into a sleeve 11 with internal projections and indentations which may, for example, take the form of screw-threads as shown in the upper part of the figure, or ribs and grooves as shown in the lower part of the figure. For the purpose of making such a sleeve, a journal 12 previously formed with appropriate projections and indentations may have the defined mixture moulded therearound and a backing 13 may then be injection moulded between the sleeve around the journal and a removable outer mould such as ring 14. In cases where such bearing elements are internally screw-threaded, they may be moulded separately from the journal and subsequently screwed in position thereon.

Again, of course, the backing material will be located and held by external keys on the bearing structure and the actual formation of the bearing structure and backing may be effected in various alternative ways.

In FIGURE 6, a bearing element is shown in the form of a thrust washer having a bearing structure 15, in the form of a thin annular disc composed of the defined mixture, on each face. These discs 15 are keyed to opposite faces of an intermediate backing disc 16, the application of the discs to the backing being effected by direct moulding, by subsequent fitting after independent moulding, or in any other convenient manner. If desired, of course, one of the discs 15 could be omitted to provide a thrust washer with a bearing structure on only one face depending upon the particular use to which the washer is to be put.

In the embodiment shown in FIGURE 7, a bearing element is made in hollow frusto-conical form so that both journal and thrust loads can be taken thereby. In this case a frusto-conical bearing structure 17 composed of the defined mixture is formed with keyways on the outer periphery, and backing material 18 is applied to the keyed face to provide, in this example, an element with an internal bearing surface. Equally, however, the bearing structure and backing could be reversed so that an external bearing surface is provided, or such surface could be provided on both inner and outer faces of the bearing element. As shown, the frusto-conical element is fitted over a section of a shaft journal 19 which is of complementary form and is supported in an outer housing such as 20.

I claim:

1. A low friction greaseless bearing comprising a bearing element which is formed, to provide a bearing surface and a reverse non-bearing surface, from a mixture of hard wearing low friction thermoplastic synthetic resin and a polymerized fluorinated hydrocarbon, and a backing element which is formed from a different flexible material and is keyed to the non-bearing surface of said bearing element to provide support for said bearing element.

2. A low friction greaseless bearing as claimed in claim 1 in which the polymerized fluorinated hydrocarbon is polytetrafluoroethylene.

3. A low friction greaseless bearing as claimed in claim 2 in which the low friction thermoplastic synthetic resin consists of a substance selected from the polyamides, the polyethylenes and the polyurethanes.

4. A low friction greaseless bearing as claimed in claim 3 in which the low friction thermoplastic synthetic resin is nylon.

5. A low friction greaseless bearing as claimed in claim 1 in which the bearing element is generally of ring form.

6. A low friction greaseless bearing element as claimed in claim 1 in which the backing material is of disc form, at least one face of said disc having a similarly shaped bearing structure keyed thereto.

7. A low friction greaseless bearing as claimed in claim 1 in which the backing element is made from material selected from a group of materials consisting of the polyamides, the polyethylenes and the polyurethanes.

8. A low friction greaseless bearing element as claimed in claim 1 in the form of a socket part for a ball joint.

9. A low friction greaseless bearing as claimed in claim 1 in the form of a journal bush.

10. A low friction greaseless bearing element as claimed in claim 1 in the form of a sleeve having an inner bearing structure and an outer backing, the inner bearing structure having internal projections and indentations thereround for mating with corresponding indentations and projections on a journal to provide a combined journal and thrust bearing.

11. A low friction greaseless bearing element as claimed in claim 1 in the form of a thrust washer having a backing with a disc-like bearing structure on at least one face thereof.

12. A low friction greaseless bearing element as claimed in claim 1 in the form of a hollow frusto-conical sleeve intended for location between a correspondingly shaped inner journal and outer housing to accept both journal and thrust loads.

13. A low friction greaseless bearing as claimed in claim 1 in which the backing element is made from material selected from a group of materials consisting of elastomer-type material.

References Cited by the Examiner

UNITED STATES PATENTS

| 2,666,677 | 1/1954 | Miller. | |
| 2,695,425 | 11/1954 | Scott. | |
| 2,815,253 | 12/1957 | Spriggs. | |
| 2,944,831 | 7/1960 | Thomas. | |
| 2,975,128 | 3/1961 | Scott. | |
| 2,998,397 | 8/1961 | Riesing. | |
| 3,070,408 | 12/1962 | Reuter | 308—238 |
| 3,094,376 | 6/1963 | Thomas | 308—238 |

FOREIGN PATENTS 778,816  7/1957  Great Britain.

DAVID J. WILLIAMOWSKY, *Primary Examiner.*

FRANK SUSKO, DON A. WAITE, *Examiners.*